US010996771B2

(12) United States Patent
Youn

(10) Patent No.: US 10,996,771 B2
(45) Date of Patent: May 4, 2021

(54) ELECTRONIC APPARATUS AND CONTROL METHOD THEREOF

(71) Applicant: Samsung Electronics Co., Ltd., Suwon-si (KR)

(72) Inventor: So-young Youn, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/103,346

(22) Filed: Aug. 14, 2018

(65) Prior Publication Data

US 2019/0114070 A1 Apr. 18, 2019

(30) Foreign Application Priority Data

Oct. 13, 2017 (KR) .................. 10-2017-0133542

(51) Int. Cl.
| | |
|---|---|
| *G06F 3/0354* | (2013.01) |
| *G06F 3/0488* | (2013.01) |
| *G06F 3/0481* | (2013.01) |
| *G06F 3/0484* | (2013.01) |
| *G06F 3/044* | (2006.01) |
| *G06F 3/041* | (2006.01) |

(52) U.S. Cl.
CPC ........ *G06F 3/03545* (2013.01); *G06F 3/0441* (2019.05); *G06F 3/0442* (2019.05); *G06F 3/04162* (2019.05); *G06F 3/04812* (2013.01); *G06F 3/04842* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 7,555,705 B2 | 6/2009 | Chen et al. | |
| 8,467,991 B2 | 6/2013 | Khosravy et al. | |
| 8,990,737 B2 | 3/2015 | Ragan | |
| 9,547,425 B2 | 1/2017 | Wilson et al. | |
| 9,552,138 B2 | 1/2017 | Kim et al. | |
| 2009/0146975 A1* | 6/2009 | Chang ................. | G06F 3/03545 345/179 |
| 2011/0141067 A1* | 6/2011 | Misawa ................ | G06F 3/0304 345/179 |

(Continued)

FOREIGN PATENT DOCUMENTS

| | | |
|---|---|---|
| JP | 2002-77805 A | 3/2002 |
| JP | 5977697 B2 | 8/2016 |

(Continued)

*Primary Examiner* — Nicholas J Lee
(74) *Attorney, Agent, or Firm* — Jefferson IP Law, LLP

(57) ABSTRACT

An electronic apparatus for controlling a touch screen is provided. The electronic apparatus includes a touch screen for sensing a signal generated by an electronic pen and displaying an image, and at least one processor configured to, in response to an object displayed on the touch screen being selected based on a first signal generated by the electronic pen, control the touch screen to obtain a search result for the selected object and provide the search result, and in response to the object displayed on the touch screen being selected based on a second signal generated by the electronic pen, control the touch screen to display a user interface (UI) for preforming a function related to the selected object.

19 Claims, 19 Drawing Sheets

(56) References Cited

U.S. PATENT DOCUMENTS

| | | | | |
|---|---|---|---|---|
| 2011/0297457 A1* | 12/2011 | Yeh | ..................... | G06F 3/03545 |
| | | | | 178/19.01 |
| 2013/0342554 A1* | 12/2013 | Sim | ........................... | G06T 1/60 |
| | | | | 345/564 |
| 2014/0062962 A1* | 3/2014 | Jang | ........................ | G06F 17/21 |
| | | | | 345/175 |
| 2014/0172831 A1* | 6/2014 | Jin | ........................ | G06F 16/248 |
| | | | | 707/722 |
| 2015/0169213 A1* | 6/2015 | Choi | ....................... | G06F 3/167 |
| | | | | 715/728 |
| 2015/0234528 A1* | 8/2015 | Choi | ................... | G06F 3/04883 |
| | | | | 715/716 |
| 2017/0031470 A1 | 2/2017 | Chae | | |

FOREIGN PATENT DOCUMENTS

| | | | |
|---|---|---|---|
| KR | 10-0972335 | B1 | 7/2010 |
| KR | 10-2014-0001265 | A | 1/2014 |
| KR | 10-2014-0030391 | A | 3/2014 |
| KR | 10-2014-0096752 | A | 8/2014 |

\* cited by examiner

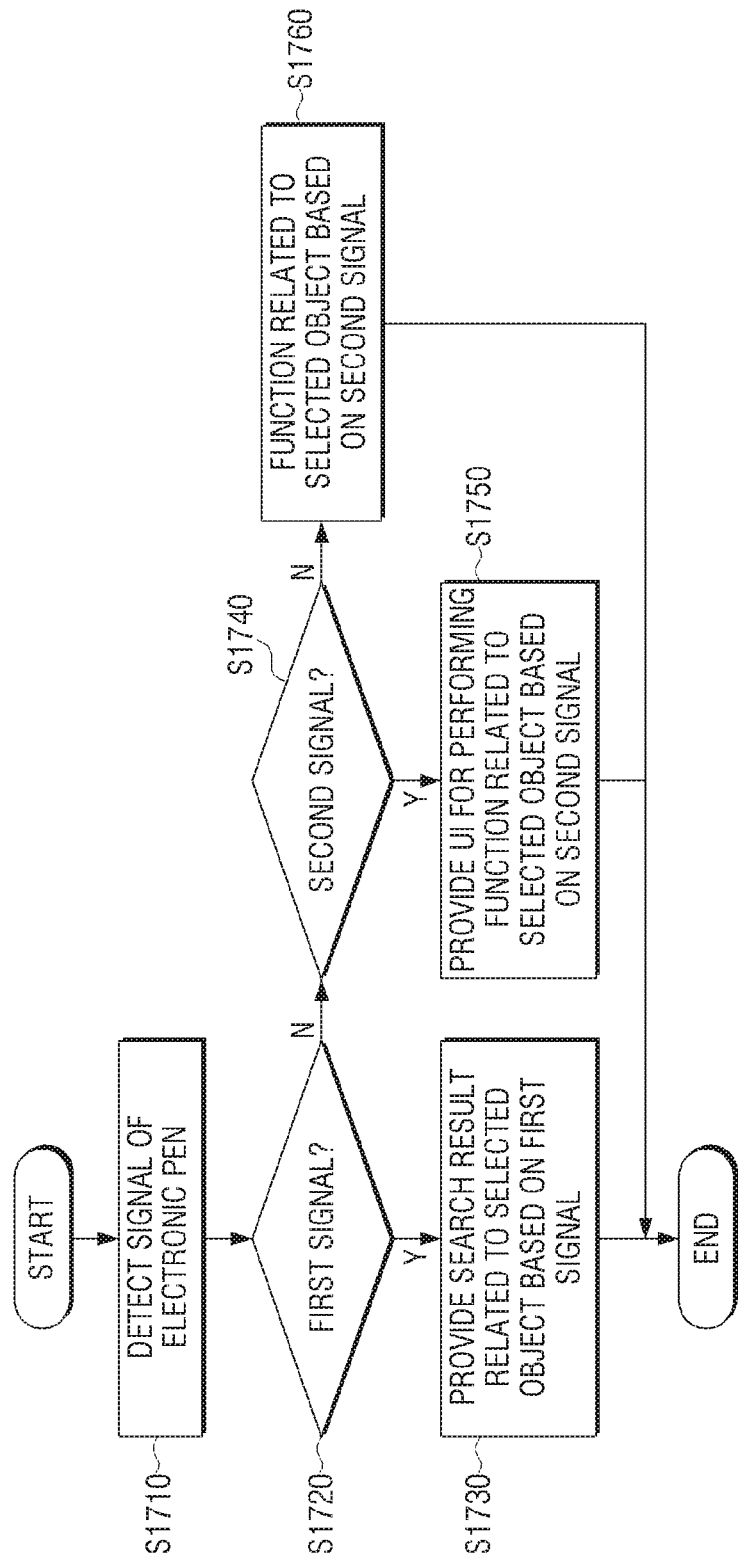

ELECTRONIC APPARATUS AND CONTROL METHOD THEREOF

CROSS-REFERENCE TO RELATED APPLICATION(S)

This application is based on and claims priority under 35 U.S.C. § 119 of a Korean patent application number 10-2017-0133542, filed on Oct. 13, 2017, in the Korean Intellectual Property Office, the disclosure of which is incorporated by reference herein in its entirety.

BACKGROUND

1. Field

The disclosure relates to an electronic apparatus. More particularly, the disclosure relates to an electronic apparatus which performs an operation according to a user command input through an electronic pen and a control method thereof.

2. Description of Related Art

Electronic devices such as a tablet personal computer (PC) or a smart phone receive a user command through an electronic pen such as a stylus pen which is contacting to or close to a touch screen.

Therefore, a user may input information on a touch screen of an electronic apparatus by using an electronic pen, or edit images such as documents, pictures, etc. displayed on a touch screen.

The electronic pen has been used only for inputting information on a touch screen of an electronic apparatus or editing a displayed document or image. However, when a user is walking or in a situation that makes it impossible to easily use an electronic pen, an electronic pen cannot be used.

Therefore, various methods for operating an electronic apparatus using an electronic pen even in a situation where it is not easy to use an electronic pen are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method to control various operations of an electronic apparatus through an electronic pen.

Furthermore, the disclosure is purposed to increase the utilization of an electronic pen.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a touch screen for sensing a signal generated by an electronic pen and displaying an image, and at least one processor configured to, in response to an object displayed on the touch screen being selected based on a first signal generated by the electronic pen, control the touch screen to obtain a search result for the selected object and provide the search result, and in response to the object displayed on the touch screen being selected based on a second signal generated by the electronic pen, control the touch screen to display a user interface (UI) for preforming a function related to the selected object.

The processor may be further configured to, in response to the object being selected based on the first signal, control the touch screen to display a first color at a position where the first signal is sensed to select the object, and in response to the object being selected based on the second signal, control the touch screen to display a second color at a position where the second signal is sensed to select the object.

The electronic apparatus may further include a light emitting device provided in a body of the electronic apparatus, wherein the at least one processor is further configured to control the light emitting device to emit light of a first color while the first signal is sensed and emit light of a second color while the second signal is sensed.

The electronic apparatus may further include a communicator, wherein the at least one processor is further configured to determine an area where the first signal is sensed and detect an object displayed on the touch screen based on the area where the first signal is sensed, and control the communicator to transmit information on the detected object to an external server and receive a search result for the object from the external server.

The electronic apparatus may further include a storage, wherein the at least one processor is further configured to determine an area where the first signal is sensed, detect an object displayed on the touch screen based on the area where the first signal is sensed, and extract a search result for the object from the storage based on information on the detected object.

The UI may include a plurality of elements for editing, sharing and storing information on the detected object, and wherein the at least one processor is further configured to, based on one of the plurality of elements being selected, perform a processing operation corresponding to the selected element among processing operations of editing, sharing, storing information on the detected object.

The at least one processor may further be configured to perform a writing function based on a third signal generated by the electronic pen.

A user input for selecting the object may include at least one of a long-press input for touching an area where the object is displayed for a predetermined period of time, a double-tab input for touching the area where the object is displayed multiple times, a touch input for touching a predetermined pattern on the area where the object is displayed, or a touch input for touching the area where the object is displayed with a predetermined pressure or greater.

The signal generated by the electronic pen may be changed as a button provided in the electronic pen is pressed.

The electronic pen may emit light of a color corresponding to the signal generated by the electronic pen through a light emitting device provided on one side surface of the electronic pen.

According to an embodiment, there is provided a controlling method for an electronic apparatus. The method may include sensing a signal generated by an electronic pen, and based on an object displayed on a touch screen being selected by the sensed signal, performing a function related to the selected object according to the sensed signal, wherein the performing of the function includes based on the sensed signal being a first signal, providing a search result for the selected object based on the first signal, and based on the sensed signal being a second signal, providing a user interface (UI) for performing a function related to the selected object based on the second signal.

The performing of the function may include based on the object being selected based on the first signal, displaying a first color at a position where the first signal is sensed on a touch screen to select the object, and based on the object being selected based on the second signal, displaying a second color at a position where the second signal is sensed on the touch screen to select the object.

The performing of the function may include emitting light of a first color through a light emitting device provided in a body of the electronic apparatus while the first signal is sensed, and emitting light of a second color through the light emitting device while the second signal is sensed.

The performing of the function may include determining an area where the first signal is sensed, detecting an object displayed on the touch screen based on the area where the first signal is sensed, and transmitting information on the detected object to an external server and receiving a search result for the object from the external server.

The performing of the function may include determining an area where the first signal is sensed, detecting an object displayed on the touch screen based on the area where the first signal is sensed, and extracting a search result for the object from pre-stored information based on information on the detected object.

The UI may include a plurality of elements for editing, sharing and storing information on the detected object, and wherein the performing includes, based on one of the plurality of elements being selected, performing a processing operation corresponding to the selected element among processing operations of editing, sharing and storing information on the detected object.

The performing of the function may include, based on the sensed signal being a third signal, performing a writing function based on the third signal.

A user input for selecting the object may include at least one of a long-press input for touching an area where the object is displayed for a predetermined period of time, a double-tab input for touching the area where the object is displayed multiple times, a touch input for touching a predetermined pattern on the area where the object is displayed, or a touch input for touching the area where the object is displayed with a predetermined pressure or greater.

The signal generated by the electronic pen may be changed as a button provided in the electronic pen is pressed.

The electronic pen may emit light of a color corresponding to the signal generated by the electronic pen through a light emitting device provided on one side surface of the electronic pen.

According to the above-described various embodiments, the disclosure may control various operations of an electronic apparatus by using an electronic pen. Accordingly, the disclosure may increase the utilization of an electronic pen.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 18 is a flowchart to explain a controlling method of an electronic apparatus according to an embodiment of the disclosure.

Throughout the drawings, like reference numerals will be understood to refer to like parts, components, and structures.

DETAILED DESCRIPTION

Figure 1:
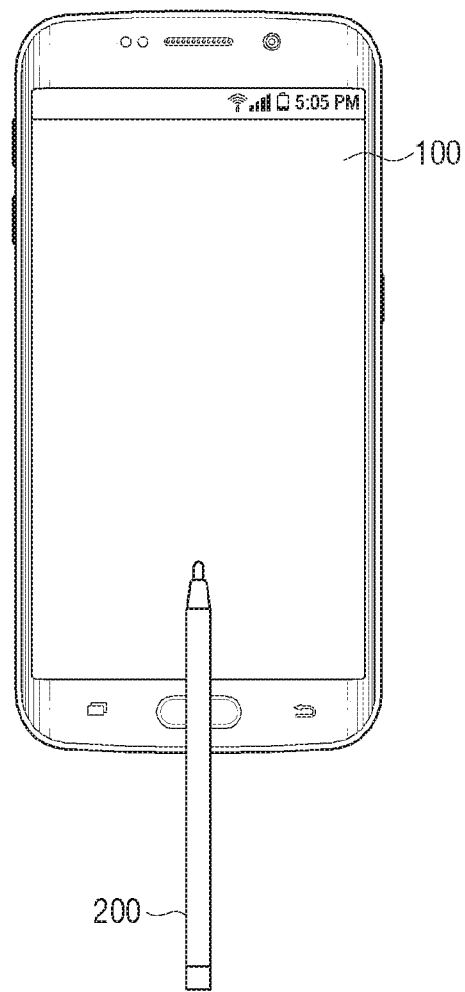
FIG. 1 is a view of an electronic apparatus that receives a user command using an electronic pen according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to describing the disclosure in detail, the method of describing this specification and drawings will be described.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

In addition, the same reference numerals as used in the accompanying drawings denote parts or components performing substantially the same function. For ease of explanation and understanding, different embodiments will be described using the same reference numerals. In other words, even though all the elements having the same reference numerals are shown in the plural drawings, the plural drawings do not mean one embodiment.

The terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

The singular expression also includes the plural meaning as long as it does not differently mean in the context. In this specification, terms such as 'include' and 'have/has' should be construed as designating that there are such characteristics, numbers, operations, elements, components or a combination thereof in the specification, not to exclude the existence or possibility of adding one or more of other characteristics, numbers, operations, elements, components or a combination thereof.

In an embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

When an element is referred to as being "connected" or "coupled" to another element, it can be directly connected or coupled to the other element or be indirectly connected or coupled to the other element with one or more intervening elements interposed therebetween. In addition, when an element is referred to as "including" a component, this indicates that the element may further include another component instead of excluding another component unless there is different disclosure.

Hereinafter, embodiments of the disclosure will be described in detail with reference to the accompanying drawings.

Figure 2:
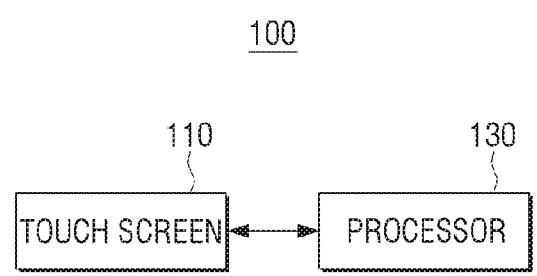
FIG. 2 is a block diagram illustrating an electronic apparatus according to an embodiment of the disclosure.

FIG. 1 is a view of an electronic apparatus that receives a user command using an electronic pen according to an embodiment of the disclosure, and FIG. 2 is a block diagram illustrating an electronic apparatus according to an embodiment of the disclosure.

Referring to FIG. 1, an electronic apparatus 100 may receive a user command through an electronic pen 200.

The electronic apparatus 100 may be capable of receiving a touch input, for example, a portable terminal device such as a smartphone, a tablet PC, etc. or a full screen display apparatus such as an electronic board. The electronic apparatus 100 may determine a position of the electronic pen 200 when the electronic 200 such as a stylus pen is contacted or approaches within a predetermined threshold distance while one of a plurality of application is executed.

Based on detecting a signal transmitted from the electronic pen 200, the electronic apparatus 100 may determine a position where the signal is detected as a portion where the electronic pen 200 is contacted to or proximate to the electronic apparatus 100. The description of determining the position of the electronic pen 200 in the electronic apparatus 100 will be made in detail below.

The electronic apparatus 100 may operate as a passive type or an active type. The passive type may be a type for generating a response signal based on a driving signal received from a touch screen 110 of the electronic apparatus 100. In other words, the passive type may be a type where the electronic apparatus 100 operates by itself without a power source.

The active type may be a type for generating a response signal through its own power source. The description of the electronic apparatus 100 which operates as a passive type or an active type will be made in detail below. When the position of the electronic pen 200 is determined, the electronic apparatus 100 may select an object related to a position where the electronic pen 200 is disposed among a plurality of objects included in an execution screen of an executing application. The electronic apparatus 100 may provide a search result for a selected object or a UI for performing operations such as editing, sharing and storing information on the selected object.

Referring to FIG. 2, the electronic apparatus 100 may include a touch screen 110 and a processor 130.

The touch screen 110 may detect a signal generated by the electronic pen 200 and a signal generated by a touch of a user body. The touch screen 110 may display data related to contents received from an external server such as a contents server (not shown) or data related to pre-stored contents, or the touch screen 110 may display various UI screens for controlling the operation of the electronic apparatus 100. The display may display an execution screen relating to an executing application among a plurality of applications.

The touch screen 110 may be embodied with a first layer detecting a signal generated by the electronic pen 200, a second layer detecting a signal generated by the touch of a user body, and a third layer displaying an image. However, the disclosure is not limited thereto, the structure of the touch screen 110 may vary.

Based on detecting a signal generated by the electronic pen 200 when the electronic pen 200 touches or approaches the touch screen 110, the processor 130 may select an object displayed on a screen based on the detected signal and perform a function related to the selected object.

Based on an object displayed on the touch screen 110 being selected based on a first signal generated by the electronic pen 200, the processor 130 may control the touch screen 110 to display a search result for the selected object.

Based on an object displayed on the touch screen 110 being selected based on a second signal generated by the electronic pen 200, the processor 130 may control the touch screen 110 to display a UI for performing a function related to the selected object.

The processor 130 may determine whether a signal generated by the electronic pen 200 is a first signal or a second signal. According to an embodiment, the processor 130 may determine whether the signal is a first signal set to retrieve information on an object, or a second signal set to display a UI for performing a function related to an object based on a frequency of the generated signal.

When the detected signal is a first signal, the processor 130 may detect an object displayed on the touch screen 110 based on an area where the first signal is detected. The object detected based on the area where the first signal is detected may be one of plurality of objects included in an execution screen of an executing application.

Based on an object being detected based on an area where the first signal is detected, according to an embodiment, the processor 130 may control the communicator 140 (e.g., a transceiver) to transmit information on the detected object to an external server (not shown), and to receive a search result for the object from the external server (not shown). Accordingly, the communicator 140 may transmit the information on the detected object to the external server (not shown) based on the area where the first signal is detected and receive the search result for the object from the external server (not shown).

Based on receiving a search result for the detected object based on the area where the first signal is detected, the processor 130 may control the touch screen 110 to display the search result received from the external server (not shown).

According to another embodiment, based on an object being detected based on the area where the first signal is detected, the processor 130 may extract the search result for the object from a storage 150 based on the information on the detected object. When the search result for the object is extracted from the storage 150, the processor 130 may control the touch screen 110 to display the search result extracted from the storage 150.

The detailed description of the communicator 140 and the storage 150 will be made below.

When a signal generated by the electronic pen 200 is a second signal, the processor 130 may detect an object displayed on the touch screen 110 based on the area where the second signal is detected. When the object is detected based on the area where the second signal is sensed, the processor 130 may control the touch screen 110 to display a UI for performing a function related to the detected object. The touch screen 110 may display a UI for performing a function related to the detected object based on the second signal.

The UI may include a plurality of elements for editing, sharing and storing information on the detected object.

When one of a plurality of elements is selected in the state where the UI including the plurality of elements is displayed, the processor 130 may perform a processing operation corresponding to the selected element among processing operations of editing, sharing and storing the information on the detected object.

The processor 130 may obtain the information on an area selected by the electronic pen 200 through an embodiment described below.

When a gallery application is executed, the touch screen 110 may display a photographed image. While such the image is displayed, based on a signal generated by the electronic pen 200 being detected, the processor 130 may detect an object included in an area where the signal generated by the electronic pen 200 is detected. The processor 130 may use the detected object as input data of a pre-defined recognition model and obtain information on the object.

The method for recognizing the detected object is a well-known technique, and therefore the detailed description thereof will be omitted in this specification.

When a camera application is executed, the touch screen 110 may display a live image to be photographed. While such a live image is displayed and a signal generated by the electronic pen 200 is detected, the processor 130 may obtain information related to the present position as information on the displayed live image (object) based on global positioning system (GPS) information.

When an address book application is executed, the touch screen 110 may display an address list including objects indicting profile information including a plurality of acquaintances' names, contact numbers, etc. When the address list is displayed, and a signal generated by the electronic pen 200 is detected, the processor 130 may detect an object related to the area where a signal is detected based on source information for generating an address list. The processor 130 may obtain profile information related to the detected object as information on the object.

Based on obtaining information on the object through various embodiments, the processor 130 may provide a search result for the object based on the obtained information on the object and perform a function related to the object.

According to a further aspect of the disclosure, when an object is selected based on the first signal generated by the electronic pen 200, the processor 130 may control the touch screen 110 to display a first color at a position where the first signal for selecting the object is detected.

When an object is selected based on a second signal generated by the electronic pen 200, the processor 130 may control the touch screen 110 to display a second color at a position where the second signal for selecting the object is detected.

The touch screen 110 may display the first color at the position where the first signal is detected and the second color at the position where the second signal is detected.

According to a further aspect of the disclosure, the processor 130 may control a light emitting unit 190 to emit the first color while the first signal is detected and emit the second color while the second signal is detected.

Accordingly, the light emitting unit 190 provided in a body of the electronic apparatus 100 may emit the first color while the first signal is detected and the second color while the second signal is detected. The detailed description of the operation of the light emitting unit 190 will be made below.

According to a further aspect of the disclosure, when a signal generated by the electronic pen 200 is a third signal, the processor 130 may perform a writing function based on the third signal generated by the electronic pen 200.

According to a further aspect of the disclosure, a user input for selecting an object displayed on the touch screen 110 based on the signal generated by the electronic pen 200 may include a long press input for touching an area where an object is displayed for a predetermined period of time, a double tab for touching the area where the object is displayed multiple times, a touch input for touching a predetermined pattern on the area where the object is displayed, and a touch pressure for touching the area where the object is displayed with a predetermined pressure or greater.

Based on an object displayed on the touch screen 110 being selected by the electronic pen 200 based on the user input, the processor 130 may provide a search result for the selected object or provide a UI for performing a function related to the selected object based on the signal generated by the electronic pen 200.

The signal generated by the electronic pen 200 may be changed as a button unit 210 provided in the electronic pen 200 is pressed. When the button provided in the electronic pen 200 is pressed, the electronic pen 200 may output frequency of the first signal. While the frequency of the first signal is output, when a button provided in the electronic pen 200 is pressed, the electronic pen 200 may change the frequency of the first signal to the frequency of the second signal and output the frequency.

The electronic pen 200 may emit light of a color corresponding to a signal generated by the electronic pen 200 through a light emitting unit 220 provided on one side surface of the electronic pen 200.

According to an embodiment, when the frequency of the first signal is output from the electronic pen 200, the light emitting unit 220 may emit the set first color related to the first signal. When the frequency of the second signal is output from the electronic pen 200, the light emitting unit 220 may emit the set second color related to the second signal.

The detailed description of the electronic pen 200 will be made below.

The operation of the electronic apparatus 100 has been described. Hereinafter, the operation of detecting a signal generated by the electronic pen 200 will be described in detail below.

Figure 3:
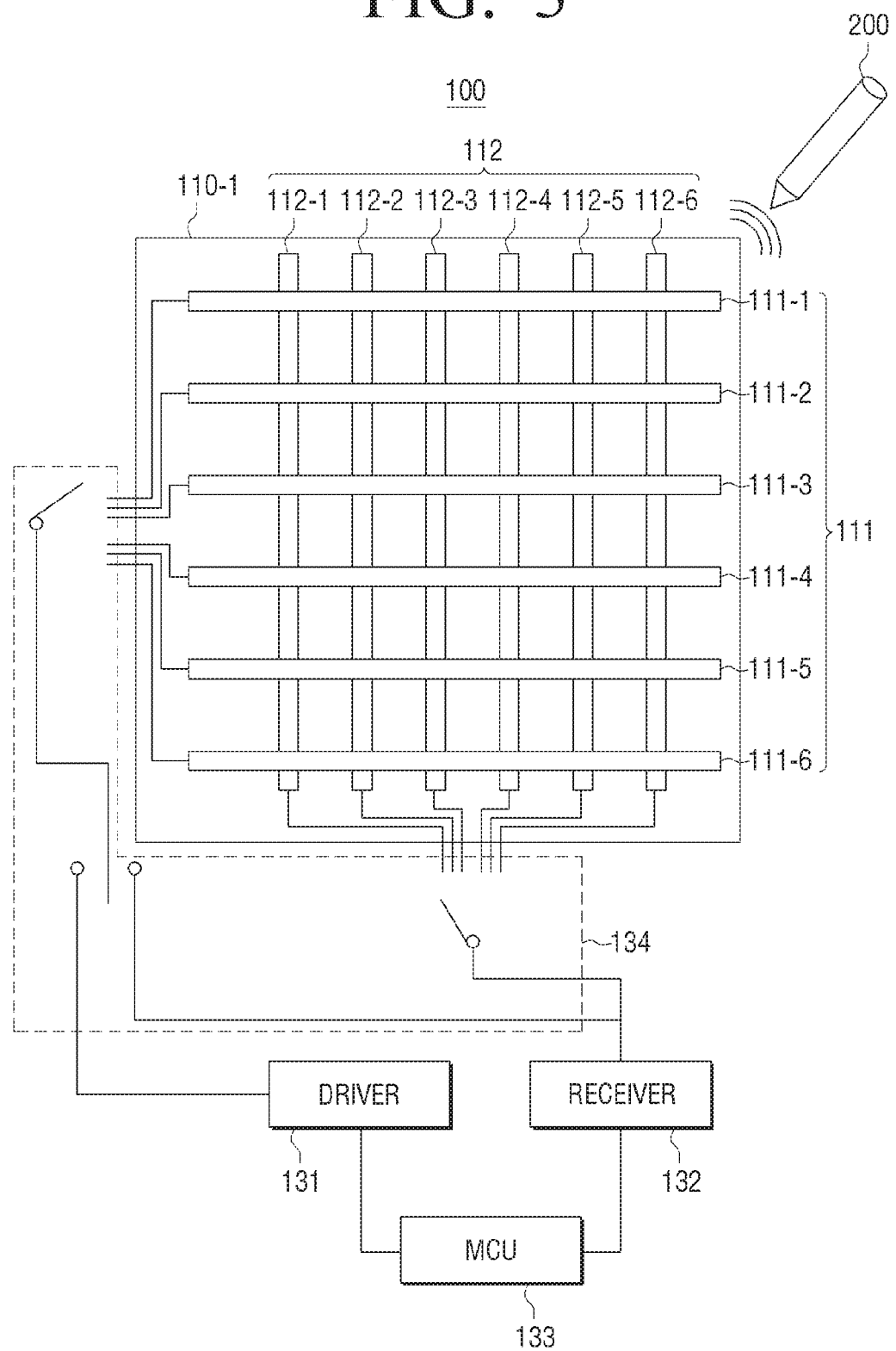
FIG. 3 is a circuit diagram illustrating a touch screen of an electronic apparatus according to an embodiment of the disclosure.

FIG. 3 is a circuit diagram illustrating a touch screen of an electronic apparatus according to an embodiment of the disclosure.

Referring to FIG. 3, a touch screen 110 may include a channel electronic unit 110-1 with a plurality of electrodes. The touch screen 110 may receive a signal transmitted from the electronic pen 200 which touches or approaches the touch screen 110 through at least one of a plurality of electrodes included in the channel electronic unit 110-1 and transmit the signal to the processor 130.

The channel electrode unit 110-1 may include a first electrode group 111 and a second electrode group 112 which are arranged in different directions.

The first electrode group 111 may include a plurality of first electrodes 111-1, 111-2, 111-3, 111-4, 111-5 and 111-6 which are arranged in a first direction (a horizontal direction). The first electronic may be a transparent electronic, that is, Indium Tin Oxide (ITO).

The second electronic group 112 may include a plurality of second electrodes 112-1, 112-2, 112-3, 112-4, 112-5 and 112-6 which are arranged in a second direction (a vertical direction). The second electrode may be a transparent electrode, that is, Indium Tin Oxide (ITO).

According to the embodiment, it is described that 6 (six) electrodes are included in each group, but when embodying the disclosure, electrodes greater than or smaller than six electrodes may constitute an electrode group. In addition, according to the embodiment, it is illustrated that the shape of an electrode is a rectangular shape, but when embodying the disclosure, the shape of the electrode may vary in a more complex form.

The processor 130 that controls the touch screen 110 may determine a position of the electronic pen 200 which contacts or approaches the touch screen 110 based on a signal received from a channel electrode unit 110-1 included in the touch screen 110.

The processor 130 may include a driver 131, a receiver 132 and a microcontroller (MCU) 133.

The MCU 133 may control the driver 131 and the receiver 132 to transmit and receive a signal to and from the electronic pen 200 by using the first and second electrode groups 111 and 112 included in the channel electrode unit 110-1. For convenience of explanation, a period of time for outputting a signal related to transmission may be referred to as a transmission period, and a period of time for receiving a signal output from the electronic pen 200 may be referred to as a receiving period.

For example, the MCU 133 may control the driver 131 so that a driving signal is applied to at least one of a plurality of first electrodes included in the first electrode group 111 during a first time period which is a transmission period. The MCU 133 may control the receiver 132 to receive a signal output from the electronic pen 200 from at least one of a plurality of second electrodes included in the second electrode group 112 during a second time period which is a receiving period.

The driver 131 may simultaneously or sequentially apply driving signals to the plurality of first electrodes 111-1, 111-2, 111-3, 111-4, 111-5 and 111-6 included in the first electrode group 111 during a transmission period. Alternatively, the driver 121 may sequentially apply driving signals to a predetermined number of electrodes (e.g., 2 to 5). In this case, the predetermined number of electrodes may be electrodes continuously arranged or electrodes dispersed in a predetermined pattern.

The receiver 132 may receive a signal output from the electronic pen 200 through the channel electrode unit 110-1. The receiver 132 may receive a signal output from the electronic pen 200 through a plurality of electrodes included in the channel electrode unit 110-1 during a receiving period. A receiving method for a signal output from the electronic pen 200 may be achieved through various embodiments.

According to an embodiment, the receiver 132 may receive a signal output from the electronic pen 200 using both the first electrode group 111 and the second electrode group 112.

According to another embodiment, the receiver 132 may sequentially receive signals output from the electronic pen 200 on an electrode basis, or receive a signal output from the electronic pen 200 using a predetermined plurality of electrodes. The electrodes used for receiving a signal may be electrodes which are continuously arranged, or arranged at intervals.

The receiver 132 may amplify a signal transmitted from each electrode, convert the amplified signal into a digital signal and perform a processing of the digital signal to extract frequency of the signal output from the electronic pen 200 or a pattern of the signal. The method for extracting the frequency of the received signal may be Fourier conversion, etc.

When a signal processed by the receiver 132 is received, the MCU 133 may determine a type of signal generated by the electronic pen 200 based on the frequency of the received signal or the pattern of the received signal.

When the frequency of the signal received from the electronic pen 200 is frequency corresponding to a predetermined first signal, the MCU 133 may determine the signal received from the electronic pen 200 as a first signal. When the frequency of the signal received from the electronic pen 200 is frequency corresponding to a predetermined second signal, the MCU 133 may determine a signal received from the electronic pen 200 as a second signal.

When the frequency of the signal received from the electronic pen 200 is frequency corresponding to a predetermined third signal, the MCU 133 may determine a signal received from the electronic pen 200 as a third signal.

When a signal is received from a plurality of electrodes included in the channel electrode unit 110-1 through the receiver 132, the MCU 133 may determine a position of the electronic pen 200 based on signal intensity between signals received from a plurality of first electrodes included in the first electrode group 111, and signal intensity between signals received from a plurality of second electrodes included in the second electrode group 112.

For example, when the signal intensity of a first electrode 111-3 included in the first electrode group 111 is greater than signal intensity of another first electrode, and the signal intensity of a second electrode 112-2 included in the second electrode group 112 is greater than the signal intensity of another second electrode, the MCU 133 may determine a position where the first electrode 111-3 intersects the second electrode 112-2 as a position where the electronic pen 200 contacts or approaches the touch screen.

However, when the position of the electronic pen 200 is determined according to the above described method, the interval between the resolution of the position and the electrode may be the same. Therefore, in order to determine a position based on a higher resolution, the MCU 133 may compare and interpolate the signal intensity received from electrodes included in each electrode group to determine a position where the electronic pen 200 contacts or approaches the electronic apparatus 100.

The switching unit 134 may selectively connect a plurality of electrodes to the driver 131, or a plurality of electrodes to the receiver 132. The switching unit 134 may connect an electrode to which a driving signal is to be applied to the driver 131 according to a control command of the MCU 133. However, the disclosure is not limited thereto. The switching unit 134 may be directly connected to the MCU 133, and may perform a switching operation according to a control command of the MCU 133 to connect the electrode to which a driving signal is to be applied to the driver 131.

The switching unit 134 may ground or float an electrode to which a driving signal is not applied.

Figure 4:
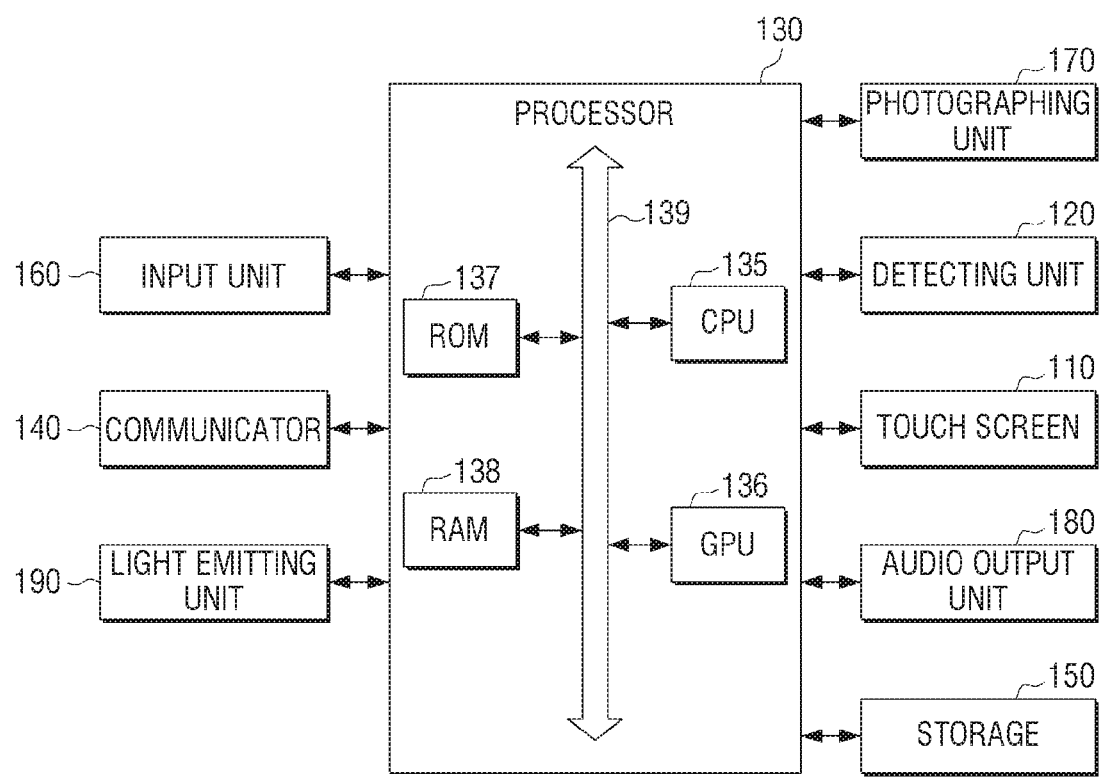
FIG. 4 is a detailed block diagram illustrating an electronic apparatus according to an embodiment of the disclosure.

FIG. 4 is a detailed block diagram illustrating an electronic apparatus according to an embodiment of the disclosure.

Referring to FIG. 4, an electronic apparatus 100 may further include a detecting unit 120, a communicator 140, a storage 150, an input unit 160, a photographing unit 170, an audio output unit 180 and a light emitting unit 190 in addition to the touch screen 110 and the processor 130 described above.

The detecting unit 120 may detect brightness of peripheral environment and an external temperature through a luminance sensor (not shown), a temperature sensor (not shown), etc. The detecting unit 120 may detect a touch pressure of a user or a touch pressure of the electronic pen 200 through a pressure sensor (not shown), etc. In addition, the detecting unit 120 may detect the movement of the electronic apparatus 100 through an accelerometer sensor (not shown), a magnetic sensor (not shown), a gravity sensor (not shown), and a gyro sensor (not shown). The accelerometer sensor (not shown) may be an acceleration sensor that measures the acceleration or impact of the moving electronic apparatus or electronic pen 200. The magnetic sensor (not shown) may be a sensor that can detect an azimuth angle using a geomagnetic field. The gravity sensor (not shown) may detect a direction in which gravity acts, and automatically rotate according to a direction in which a user holds the electronic apparatus 100 to sense the direction. The gyroscope sensor (not shown) may be a sensor that recognizes the 6-axis direction by adding each rotation to the existing motion sensor (not shown) to recognize more detailed motion.

The communicator 140 may communicate with a terminal device (not shown) capable of wireless communication, a content server (not shown) providing contents, and a web server (not shown) providing web contents. The communicator 140 may be implemented as a communication module such as a near field wireless communication module (not shown), a wireless communication module (not shown), and the like. The near field wireless communication module (not shown) may be a communication module that performs wireless communication with a terminal device (not shown) located in a short distance, for example, Bluetooth, Zigbee, Near Field Communication, and the like. The wireless communication module (not shown) may be connected to a mobile communication network according to various mobile communication standards such as Wi-Fi, 3rd generation (3G), 3rd generation partnership project (3GPP), and long-term evolution (LTE) (not shown), and perform communication with a terminal device (not shown), a content server (not shown), a web server (not shown), etc.

The storage 150 may store programs for driving the electronic apparatus 100, execution programs for executing a plurality of application, contents, data, etc. In addition, the storage 150 may store frequency information for each signal or pattern information output from the electronic pen 200.

The input unit 160 may receive a user command and may be an input means for receiving a selection command according to various user operations and transmitting the selection command to the processor 130. The input unit 160 may be embodied as a touch pad capable of touch input or a key pad including various function keys, numeric keys, character keys, etc.

The photographing unit 170 may photograph a still image or a video according to a user command and may be embodied as plurality of cameras such as a front camera, a rear camera, etc.

The audio output unit 180 may output an audio signal processed from audio data included in contents requested by a user.

The light emitting unit 190 may emit different color according to the type of signal generated by the electronic pen 200. As described above, the light emitting unit 190 may emit the first color while the first signal generated by the electronic pen 200 is detected, and emit the second color while the second signal generated by the electronic pen 200 is detected. As described above, the light emitting unit 190 may emit the third color while the third signal generated by the electronic pen 200 is detected. However, the disclosure is not limited thereto. The light emitting unit 190 may emit a fourth color indicating a communication state of the electronic apparatus 100 while the electronic pen 200 does not contact or approach the touch screen 110.

The processor 130 may further include a central processing unit (CPU) 135, a graphic processing unit (GPU) 136, a read only memory (ROM) 137, and a random access memory (RAM) 138. The CPU 135, the GPU 136, the ROM 137, and the RAM 138 may be connected to one another via a bus 139.

The CPU 135 may access the storage 150, and perform booting using the OS stored in the storage 150. The CPU 135 may perform various operations using various programs, contents, data, etc. stored in the storage 150.

The GPU 136 may generate a display screen including various objects such as icons, images, texts, etc. The GPU 136 may calculate an attribute value such as a coordinate, a shape, a size, a color, etc. of each object according to the layout of the screen based on the received control command, and generate a display screen of various layouts including the objects based on the calculated attribute value.

The ROM 137 may store a command set, etc. for system booting. When a turn-on command is input and power is supplied, the CPU 135 may copy the OS stored in the storage 150 to the RAM 138 according to the command stored in the ROM 137, execute the OS and perform system booting. When the booting is completed, the CPU 135 may copy various programs stored in the storage 150 to the RAM 138, execute the program copied to the RAM 138 and perform various operations.

The processor 130 may be implemented as a system-on-a-chip (SOC) or a system-on-chip (SoC) by being combined with the above-described components.

The operation of the processor 130 may be performed by a program stored in the storage 150. The storage 150 may embodied as the ROM 137, the RAM 138, or a memory card (e.g., secure digital (SD) card, memory stick) removable from/attachable to the electronic apparatus 100, a nonvolatile memory, a volatile memory, a hard disk drive (HDD) or a solid state drive (SSD).

Hereinafter, the detailed description of the electronic pen 200 will be made.

Figure 5:
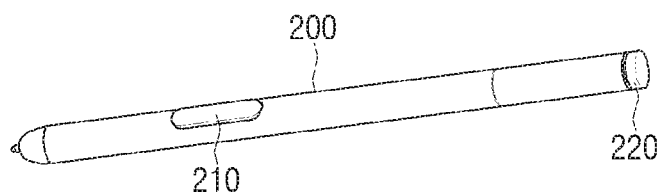
FIG. 5 is a view illustrating an electronic pen according to an embodiment of the disclosure.

FIG. 5 is a view illustrating an electronic pen according to an embodiment of the disclosure.

Referring to FIG. 5, an electronic pen 200 may include a button unit 210 and a light emitting unit 220.

The button unit 210 may be provided on one side surface of a body of the electronic pen 200, and may change the frequency of a signal to be transmitted to the electronic apparatus 100, and the light emitting unit 220 may emit light of the set color related to a signal to be transmitted from the electronic pen 200.

For example, when the electronic apparatus 100 transmits the frequency of the first signal, the light emitting unit 220 may emit light of the first color which is set related to the first signal. When the button unit 210 is pressed for transmitting the second signal changed from the first signal, the light emitting unit 220 may emit light of the second color related to the second signal.

The electronic pen 200 may embodied as a passive type for operating without its own power supply or an active type for operating with its own power supply.

Figure 6A:
FIG. 6A is a first block diagram illustrating an electronic pen according to an embodiment of the disclosure.

FIG. 6A is a first block diagram illustrating an electronic pen according to an embodiment of the disclosure.

Referring to FIG. 6A, when the electronic pen 200 is a passive type, the electronic pen 200 may further include a resonance unit 240 as shown in FIG. 6A in addition to the above-described constituent elements.

The resonance unit 240 may be embodied as a parallel connection circuit consisting of a conductive tip (not shown), an inductor (not shown) connected to the conductive tip (not shown), and a capacitor (not shown). The resonance unit 240 may form a capacitance with at least one electrode among a plurality of electrodes included in the touch screen 110 of the electronic apparatus 100 through the conductive tip (not shown). The conductive tip (not shown) may be formed of metal tip. In addition, the conductive tip (not shown) may exist in a non-conductive material or part of the conductive tip (not shown) may be exposed to an outside.

The resonance unit 240 may receive a signal for resonance through capacitive coupling between at least one electrode among a plurality of electrodes in the touch screen 110 and the conductive tip (not shown).

When the electronic pen 200 is enabled by a signal for resonance, the resonance unit 240 may transmit a signal of predetermined frequency to the electronic apparatus 100 through the conductive tip (not shown). The resonance unit 240 may apply a signal corresponding to the color to the light emitting unit 220 to emit light of predetermined color related to the signal of the frequency.

According to an embodiment, when a user command is input through the button unit 210, the resonance unit 240 may generate a signal of frequency corresponding to the input user command and transmit the signal to the electronic apparatus 100.

However, the disclosure is not limited thereto. The resonance unit 240 may generate a signal of frequency corresponding to a contact pressure of the conductive tip (not shown) contacted to one area of the touch screen 110 and output the signal to the electronic apparatus 100.

For example, the resonance unit 240 may output a first signal having a predetermined first frequency to the electronic apparatus 100 through a conductive tip (not shown). When the button unit 210 is pressed while the first signal is being output, the resonance unit 240 may change the first signal to the second signal having a predetermined second frequency, and output the second signal to the electronic apparatus 100 through the conductive tip (not shown). The resonance unit 240 may apply a signal for emitting light of a predetermined color related to the second signal having the second frequency to the light emitting unit 220. Accordingly, the light emitting unit 220 may emit light of the predetermined color related to the second signal based on the signal applied from the resonance unit 240.

Figure 6B:
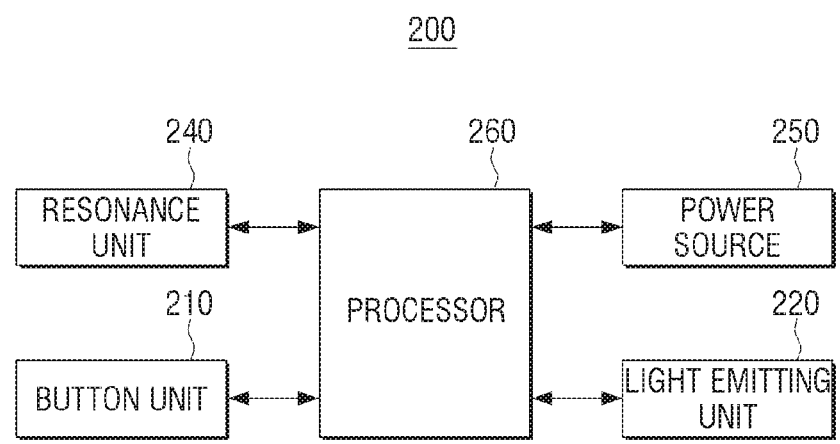
FIG. 6B is a second block diagram illustrating an electronic pen according to another embodiment of the disclosure.

FIG. 6B is a second block diagram illustrating an electronic pen according to another embodiment of the disclosure.

Referring to FIG. 6B, when the electronic pen 200 is an active type, the electronic pen 200 may include a resonance unit 240, a power source 250 and a processor 260 as shown in FIG. 6B in addition to the button unit 210 and the light emitting unit 220 described above.

The resonance unit 240 may form a capacitance with at least one electrode among a plurality of electrodes included in the touch screen 110 of the electronic apparatus 100 through the conductive tip (not shown), and the power source 250 may supply power to each element of the electronic pen 200. Based on a user command being input through the button unit 210, the processor 260 may generate a signal of a frequency corresponding to a user command, and transmit the generated signal of the frequency to the electronic apparatus 100 which forms a capacitance with the resonance unit 240 through the resonance unit 240.

The processor 260 may control the light emitting unit 220 to emit light of a color corresponding to a signal of frequency transmitted to the electronic apparatus 100 based on color information for each frequency pre-stored in an internal memory (not shown).

For example, the processor 260 may output a first signal having a predetermined first frequency to the electronic apparatus 100 through the resonance unit 240. When the button unit 210 is pressed while the first signal is being output, the processor 260 may change the first signal to the second signal having the second frequency, and output the second signal to the electronic apparatus 100 through the resonance unit 240. The processor 260 may control the light emitting unit 220 to emit light of a predetermined color related to the second signal having the second frequency. The light emitting unit 220 may emit light of a predetermined color related to the second signal applied to the electronic apparatus 200 through the resonance unit 240.

The detailed description of each element constituting the electronic apparatus 100 and the electronic pen 200 according to an embodiment of disclosure has been made. Hereinafter, the detailed description of the operation of the electronic apparatus 100 will be made below.

FIGS. 7, 8, 9, 10, and 11 are views to explain a performing of an operation according to a signal generated by an electronic pen of an electronic apparatus according to an embodiment of the disclosure.

Referring to FIGS. 7-11, the electronic apparatus 100 may display an execution screen of a first application or a second application. The first application may be a gallery application, and the second application may be a camera application.

For example, when the gallery application is executed, the electronic apparatus 100 may display an image selected by a user among a plurality of photographed images.

A user may select an area where a first object 710 among a plurality of objects included in an image displayed on a screen of the electronic apparatus 100 is disposed using the electronic pen 200. Accordingly, based on a signal generated by the electronic pen 200 being detected, the electronic apparatus 100 may analyze frequency of the detected signal and determine the type of signal. The electronic apparatus 100 may determine an area where the signal is detected from the signal generated by the electronic pen 200, and detect an object based on the determined area. As a result of determination, when the detected signal is the first signal and the detected object is the first object 710, the electronic apparatus 100 may obtain information on the first object 710 through the above described example embodiments.

Figure 8:
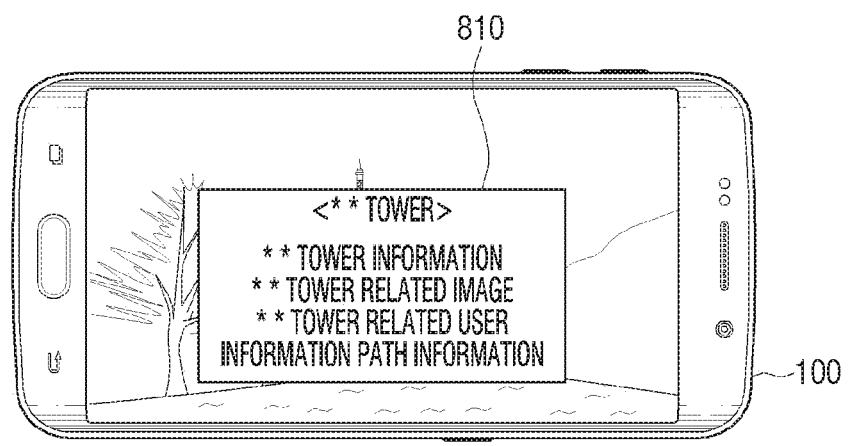

For example, the electronic apparatus 100 may obtain a name with regard to the first object 710 as information on the first object 710. Based on obtaining information on the first object 710, as shown in FIG. 8, the electronic apparatus 100 may display a UI 810 for providing a search result for the first object 710. When one of a plurality of elements included in the displayed UI 810 is selected, the electronic apparatus 100 may provide the search result for a preselected element based on the information on the first object 710 by receiving from an external server (not shown) or extracting from the storage 150.

For example, when an element regarding " tower information" is selected from a plurality of elements included in the UI 810 which is displayed, the electronic apparatus 100 may receive the search result for "tower" from the external server (not shown) to provide. When an element regarding "**tower related user information" is selected from a plurality of elements included in the displayed UI 810, the electronic apparatus 100 may extract an image related to the first object 710 from a plurality of pre-stored images to provide.

Figure 7:
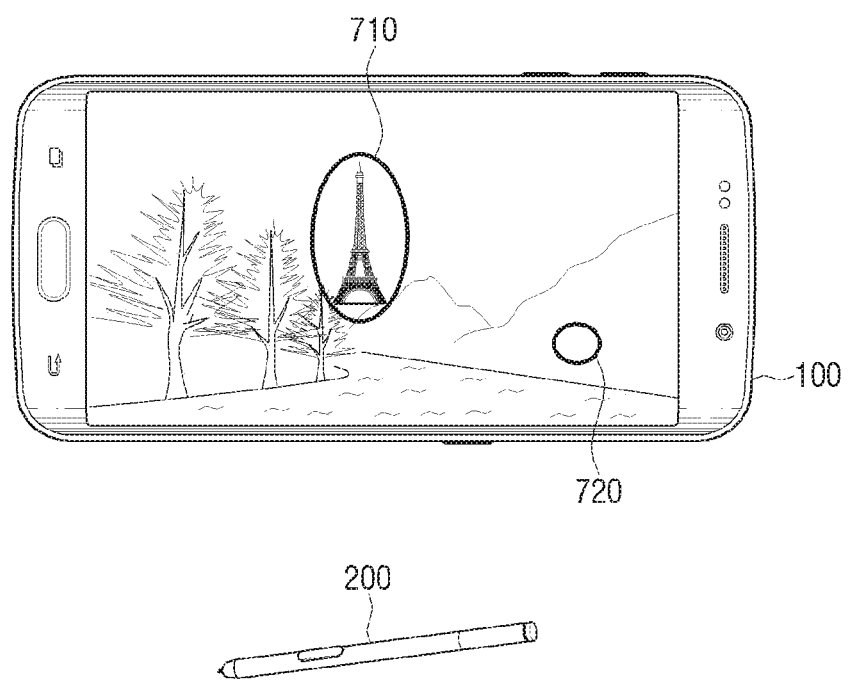
FIGS. 7, 8, 9, 10, and 11 are views to explain a performing of an operation according to a signal generated by an electronic pen of an electronic apparatus according to an embodiment of the disclosure.

When a camera application is executed in FIG. 7, the electronic apparatus 100 may display a live image to be photographed.

While the live image is displayed, a user may select a first area 720 of the live image displayed on the screen of the electronic apparatus 100 by using the electronic pen 200. Based on a signal generated by the electronic pen 200 being detected, the electronic apparatus 100 may analyze the frequency of the detected signal and determine the type of signal. The electronic apparatus 100 may obtain information related to the position as the information on the displayed live image (object) based on global positioning system (GPS) information.

Figure 9:
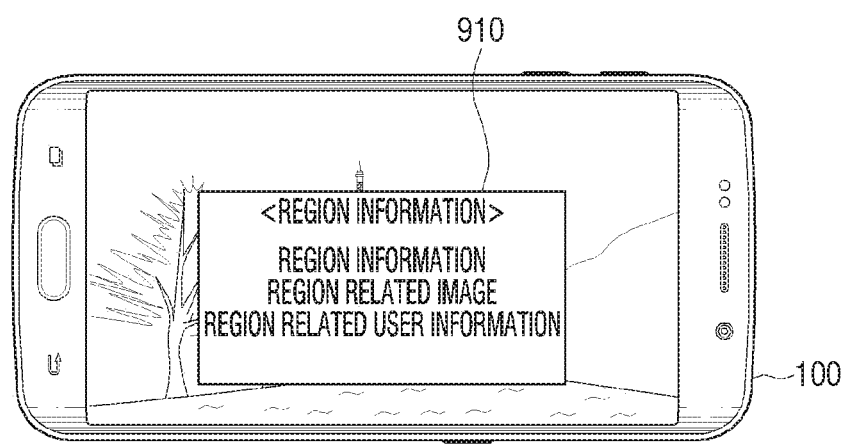

Based on obtaining information on the live image, as shown in FIG. 9, the electronic apparatus 100 may display a UI 910 for providing a search result at the position related to the live image. When one of a plurality of elements included in the displayed UI 910 is selected, the electronic apparatus 100 may provide a search result for the selected element by receiving from an external server (not shown) or extracting from the storage 150.

For example, when an element related to "region information" is selected from a plurality of elements included in the UI 910 which is displayed, the electronic apparatus 100 may receive the search result including region information such as restaurants, tourist attractions, etc. located in the position related to the live image from the external server (not shown) to provide. When an element relating to "region related image" is selected from a plurality of elements included in the displayed UI 910, the electronic apparatus 100 may extract an image photographed at the position related to the live image from a plurality of pre-stored images based on the information related to the live image.

Figure 10:
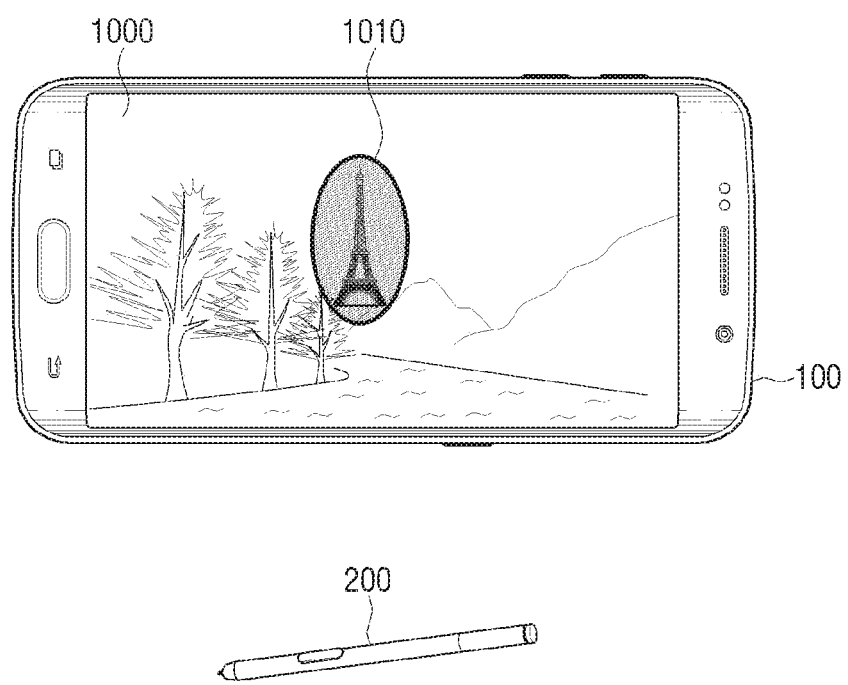
Figure 11:
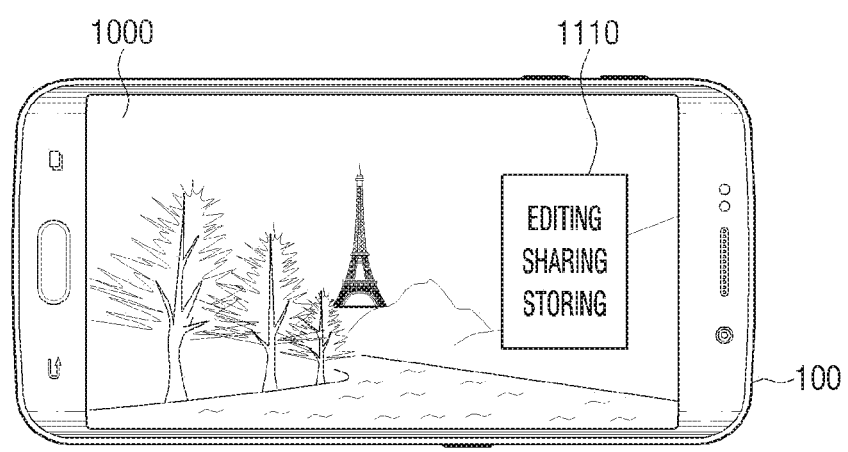

The electronic apparatus 100 may display a photographed image 1000 as shown in FIG. 10. The user may select an area where a first object 1010 is located from a plurality of objects included in the image 1000 displayed on the screen of the electronic apparatus 100 by using the electronic pen 200. Based on detecting a signal generated by the electronic pen 200, the electronic apparatus 100 may determine the type of signal by analyzing the frequency of the detected signal. The electronic apparatus 100 may determine an area where the signal is detected from the signal generated by the electronic pen 200 and detect an object based on the determined area. As a result of determination, when the sensed signal is a second signal, and the detected object is the first object 1010, the electronic apparatus 100 may display a UI 1110 for editing, sharing and storing information on the first object 1010 as shown in FIG. 11.

When one of a plurality of elements included in the displayed UI 1110 is selected, the electronic apparatus 100 may perform a processing operation corresponding to the selected element among processing operations of editing, sharing and storing information on the first object 1010.

For example, when an element regarding "editing" is selected from a plurality of elements included in the displayed UI 1110, the electronic apparatus 100 may provide a UI for receiving a text command from a user with respect to the first object 1010.

According to another example, when an element "sharing" is selected from a plurality of elements included in the displayed UI 1110, the electronic apparatus 100 may execute a social networking service (SNS) application, and upload the image 1000 including the first object 1010 to an SNS server through the executed SNS application.

According to another example, the electronic apparatus 100 may display the photographed image 1000, and connect communication with at least one peripheral device (not shown). When the second signal transmitted from the electronic pen 200 is detected while the image 1000 is displayed, the electronic apparatus 100 may display the UI 1110 for editing, sharing and storing information on the image 1000. When an element "sharing" is selected from a plurality of elements included in the displayed UI 1110, the electronic apparatus 100 may transmit data on the displayed image 1000 to a communication connected peripheral device (not shown).

When the communication connected peripheral device (not shown) includes a plurality of peripheral devices, the electronic apparatus 100 may display a list including an element indicating each of the plurality of peripheral devices (not shown) on a screen. Based on one of the elements respectively corresponding to a plurality of peripheral devices (not shown) included in a list being selected, the electronic apparatus 100 may transmit data relating to the image 1000 displayed on the electronic apparatus 100 to the peripheral device (not shown) corresponding to the selected element.

FIGS. 12A, 12B, 13A, 13B, and 13C are views to explain a performing of an operation according to a signal generated by an electronic pen of an electronic apparatus according to another embodiment of the disclosure.

Referring to FIGS. 12A, 12B, 13A, 13B, and 13C, the electronic apparatus 100 may display an execution screen of a third application. The third application may be an address application. The electronic apparatus 100 may display an address list including objects indicating profile information including a plurality of acquaintance's names, contact numbers, etc. The user may select an area 1220 where a first object 1210 is disposed from a plurality of objects included in an address list which is displayed on a screen of the electronic apparatus 100.

Based on a signal generated by the electronic pen 200 being sensed, the electronic apparatus 100 may determine the type of signal by analyzing the frequency of the sensed signal. The electronic apparatus 100 may determine the area 1220 where the signal is detected from the signal generated by the electronic pen 200 and detect the object based on the determined area 1220. As a result of determination, when the sensed signal is a first signal and the detected object is the first object 1210, as shown in FIG. 12B, the electronic apparatus 100 may obtain profile information 1230 corresponding to the first object 1210 among a plurality of pre-stored profile information as a search result with respect to the first object 1210.

Figure 12A:
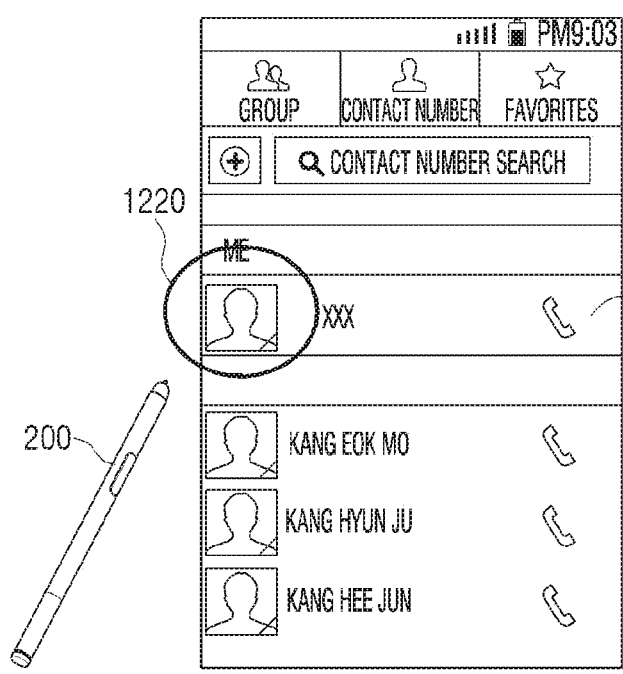
FIGS. 12A, 12B, 13A, 13B, and 13C are views to explain a performing of an operation according to a signal generated by an electronic pen of an electronic apparatus according to another embodiment of the disclosure.
Figure 12B:
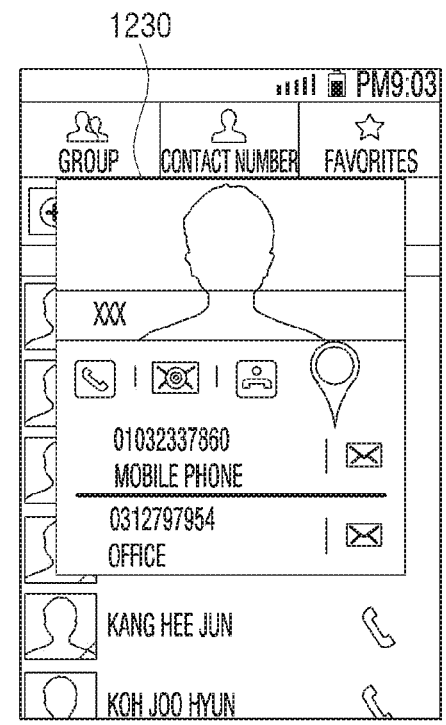

As shown in FIG. 12A, the electronic apparatus 100 may display an address list including objects which indicate profile information including a plurality of acquaintance's names, contact numbers, etc.

Figure 13A:
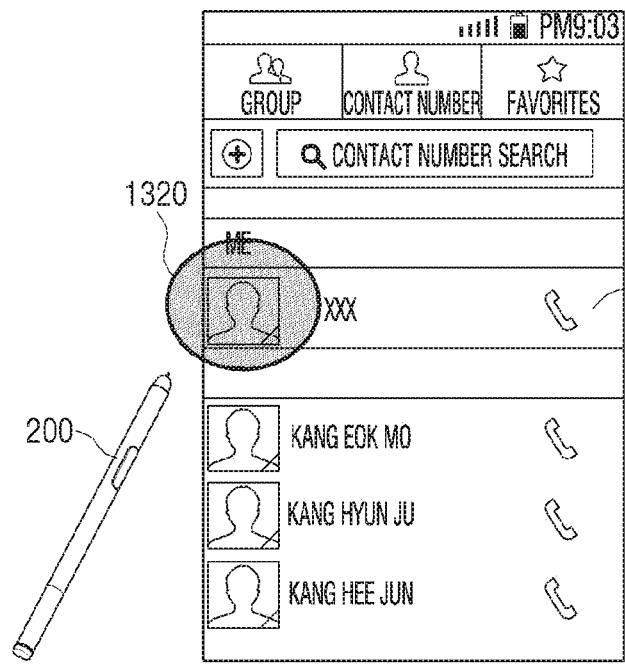

While the address list is displayed on the screen of the electronic apparatus 100, as shown in FIG. 13A, a user may select an area 1320 where the first object 1310 is located from a plurality of objects included in the address list which is displayed on the screen of the electronic apparatus 100 by using the electronic pen 200.

Figure 13B:
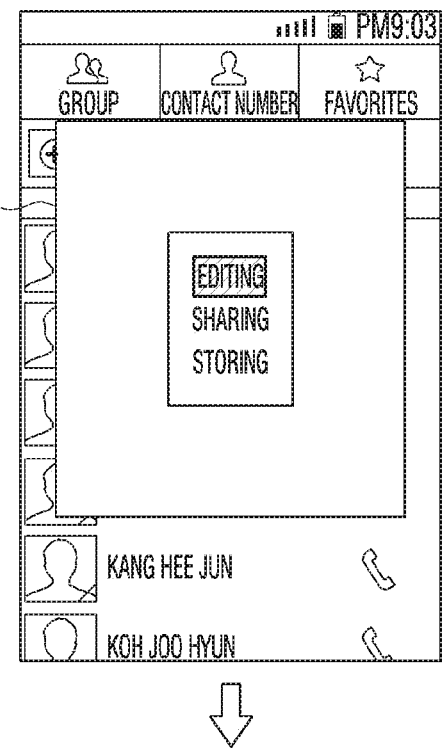

Based on a signal generated by the electronic pen 200 being sensed, the electronic apparatus 100 may determine the type of signal by analyzing the frequency of the sensed signal. The electronic apparatus 100 may determine the area 1320 where the signal is sensed from the signal generated by the electronic pen 200, and detect an object based on the determined area 1320. As a result of determination, when the sensed signal is a second signal and the detected object is the first object 1310, as shown in FIG. 13B, the electronic apparatus 100 may display a UI 1330 for performing a function related to the first object 1310.

Figure 13C:
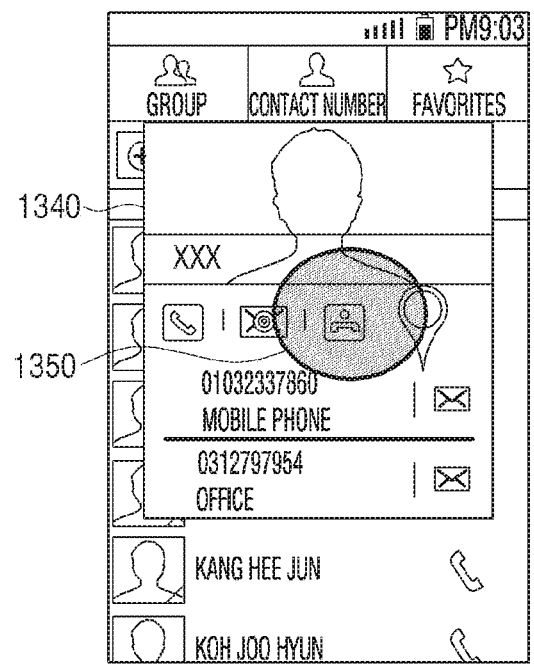

When an element "editing" is selected from a plurality of elements included in the UI 1330, as shown in FIG. 13C, the electronic apparatus 100 may display profile information 1340 corresponding to the first object 1310. A user may edit contact numbers, addresses, etc. included in the profile information 1340 displayed on the screen of the electronic apparatus 100, and when editing is completed, the electronic apparatus 100 may select an area 1350 where the profile information 1340, which has been edited, is displayed by using the electronic pen 200. Based on a signal generated by the electronic pen 200 being sensed, the electronic apparatus 100 may determine the type of signal by analyzing the frequency of the sensed signal. As a result of determination, when the sensed signal is a second signal, the electronic apparatus 100 may store the profile information 1340, which has been edited.

Figure 14A:
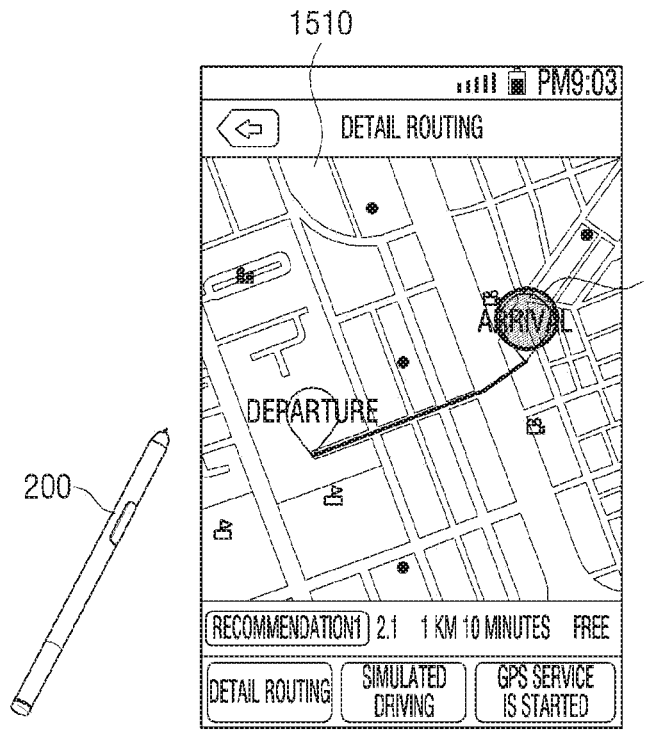
FIGS. 14A, 14B, and 14C are views to explain a performing of an operation according to a signal generated by an electronic pen of an electronic apparatus according to another embodiment of the disclosure.
Figure 14B:
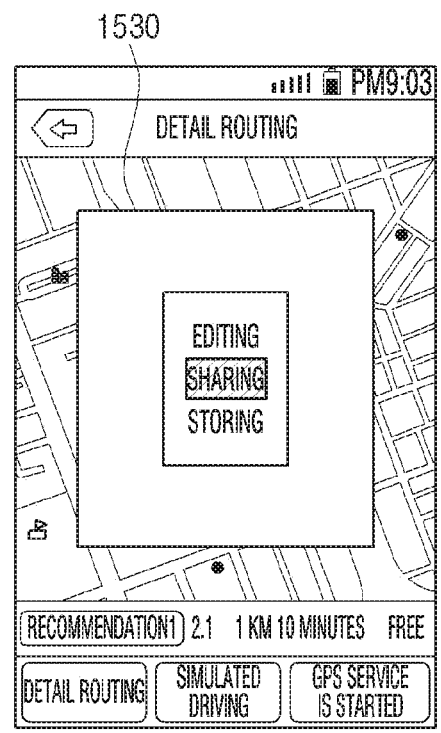
Figure 14C:
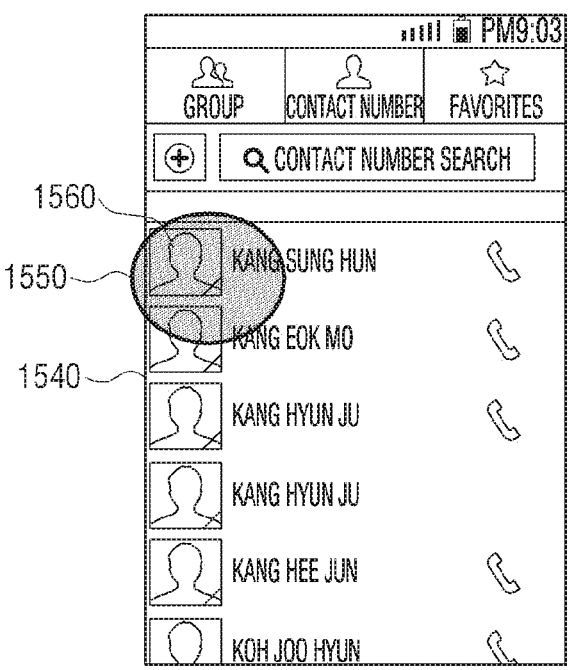

FIGS. 14A, 14B, and 14C are views to explain a performing of an operation according to a signal generated by an electronic pen of an electronic apparatus according to another embodiment of the disclosure.

Referring to FIGS. 14A, 14B, and 14C, the electronic apparatus 100 may display an execution screen of a fourth application. The fourth application may be a navigation application. Therefore, the electronic apparatus 100 may display map data 1510 showing a route to a destination requested by a user. When the map data 1510 is displayed, the user may select a destination point 1520 indicated in the map data 1510 using the electronic pen 200.

Based on a signal generated by the electronic pen 200 being sensed, the electronic apparatus 100 may determine the type of signal by analyzing the frequency of the sensed signal. The electronic apparatus 100 may determine the destination point 1520 (e.g., the destination position) where the signal is sensed from the signal generated by the electronic pen 200. As a result of determination, when the sensed signal is a second signal and the detected position is a destination, the electronic apparatus 100 may display a UI 1530 for editing, sharing and storing information on the destination as shown in FIG. 14B.

When an element "sharing" is selected from a plurality of elements included in the UI 1530, as shown in FIG. 14C, the electronic apparatus 100 may execute an address application and display an address list 1540 on a screen. While the address list 1540 is displayed, a user may select an area 1550 where a first object corresponding to an acquaintance A is disposed from a plurality of objects included in the address list 1540 by using the electronic pen 200. Based on a sensed signal generated by the electronic pen 200 being received, the electronic apparatus 100 may determine the type of signal by analyzing the frequency of the sensed signal. The electronic apparatus 100 may determine an area 1550 where the signal is sensed from the signal generated by the electronic pen 200, and detect an object based on the determined area 1550. As a result of determination, when the sensed signal is a second signal, and the detected object is a first object 1560, the electronic apparatus 100 may obtain profile information corresponding to the first object 1560 among a plurality of pre-stored profile information. The electronic apparatus 100 may transmit destination information to a terminal device (not shown) of acquaintance A based on the obtained profile information.

Figure 15A:
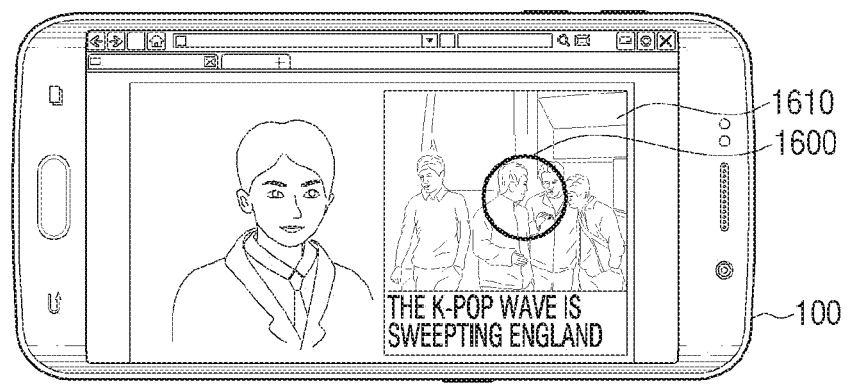
FIGS. 15A, 15B, and 15C are views to explain a performing of an operation according to a signal generated by an electronic pen of an electronic apparatus according to an embodiment of the disclosure.
Figure 15A:
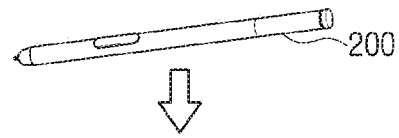
Figure 15B:
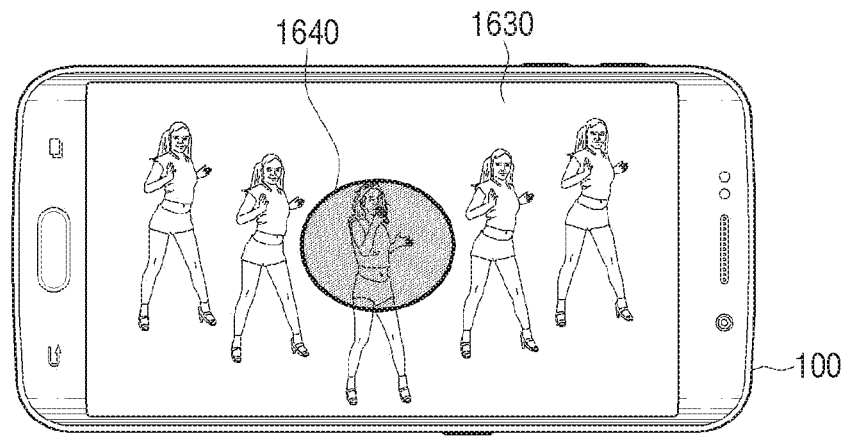
Figure 15B:
Figure 15C:
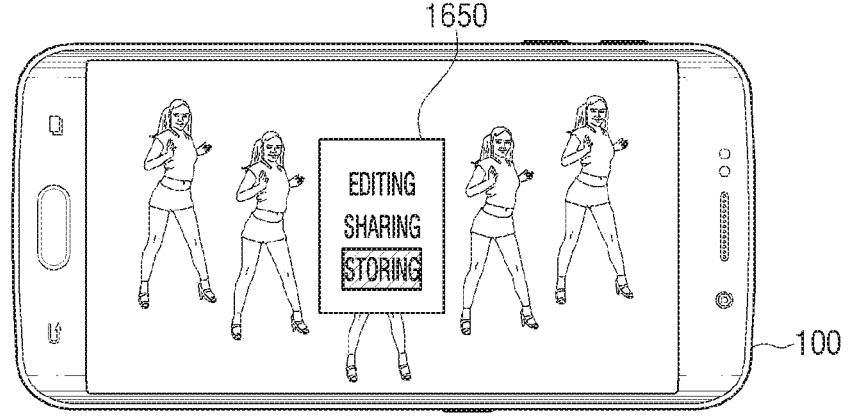

FIGS. 15A, 15B, and 15C are views to explain a performing of an operation according to a signal generated by an electronic pen of an electronic apparatus according to a further aspect of the disclosure.

Referring FIGS. 15A, 15B, and 15C, the electronic apparatus 100 may display an execution screen of a fifth application. The fifth application may be a web execution application. The electronic apparatus 100 may display a webpage 1610 requested by a user. When the webpage is being displayed, a user may select an area 1600 where a first object is disposed from a plurality of objects included in the webpage 1610 by using the electronic pen 200.

Based on a signal generated by the electronic pen 200 being sensed, the electronic apparatus 100 may determine the type of signal by analyzing the frequency of the sensed signal. The electronic apparatus 100 may determine an area where the signal is sensed from the signal generated by the electronic pen 200, and detect an object based on the area, which has been determined. As a result of determination, when the sensed signal is a first signal, and the detected object is a first object 1610, the electronic apparatus 100 may obtain information on the first object 1610 based on source information constituting the displayed webpage. As shown in FIG. 15B, the electronic apparatus 100 may display a search result 1630 with respect to the first object 1610 received from the external server (not shown) based on the information on the first object 1610 which is pre-obtained.

A user may select on area 1640 of a screen which displays the search result 1630 with respect to the first object 1610 by using the electronic pen 200. Accordingly, the electronic apparatus 10 may, based on sensing a signal generated by the electronic pen 200, analyze the frequency of the sensed signal and determine the type of signal. As a result of determination, when it is determined that the sensed signal is a second signal, as shown in FIG. 15C, the electronic apparatus 100 may display a UI 1650 for editing, sharing and storing the search result 1630 with respect to the first object 1610 which is being displayed.

When an element "storing" is selected from a plurality of elements included in the UI 1650, the electronic apparatus 100 may store the search result 1630 with respect to the first object 1610.

Figure 16A:
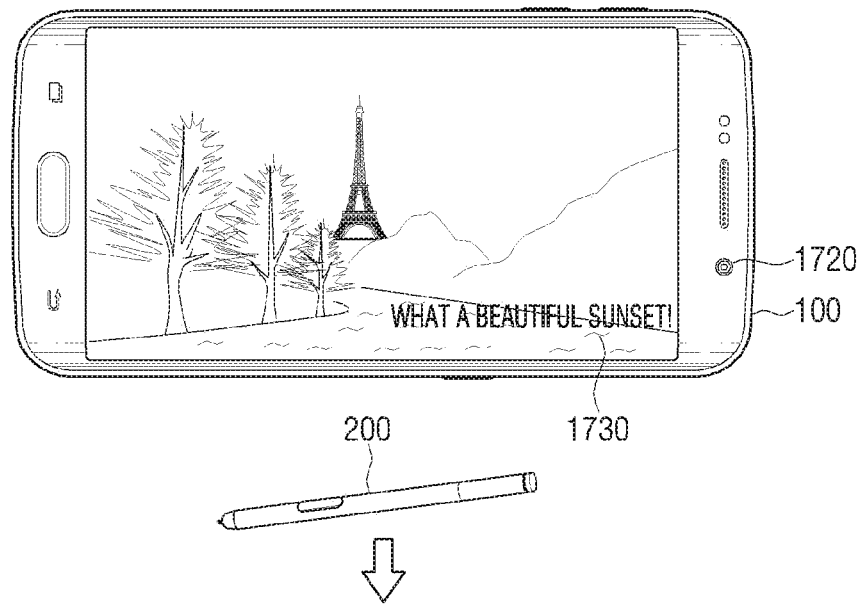
FIGS. 16A and 16B are views to explain a performing of an operation according to a signal generated by an electronic pen of an electronic apparatus according to an embodiment of the disclosure.
Figure 16B:
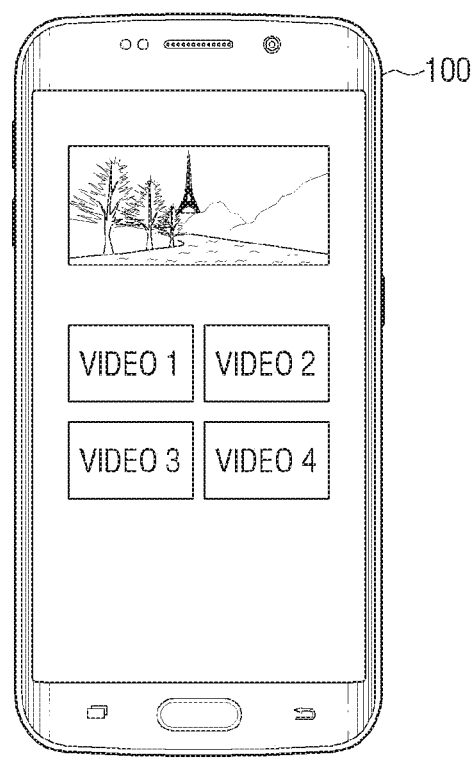

FIGS. 16A and 16B are views to explain a performing of an operation according to a signal generated by an electronic pen of an electronic apparatus according to a further aspect of the disclosure.

Referring to FIGS. 16A and 16B, the electronic apparatus 100 may record a video according to a user command. While a video is recorded, the electronic apparatus 100 may sense a third signal generated by the electronic pen 200.

A user may press a button provided on the electronic pen 200 to input texts on a screen where a video recorded by the electronic apparatus 100 is displayed by using the electronic pen 200. The electronic pen 200 may output the frequency of the signal corresponding to the user command. Therefore, the electronic apparatus 100 may determine that the signal is the third signal for inputting texts based on the frequency of the signal generated by the electronic pen 200, and display text 'what a beautiful sunset' on a screen where a video is being recorded.

The electronic apparatus 100 may emit light of predetermined third color related to the third signal through light-emitting diode (LED) 1720 arranged at the upper front of the screen where a video is being recorded.

During a video mode for recording a video, when a signal different from a third signal generated by the electronic pen 200 is sensed, the electronic apparatus 100 may change a mode of the recorded image to a preview mode. As shown in FIG. 16B, the electronic apparatus 100 may display a list with respect to a plurality of videos, which are pre-stored in the electronic apparatus 100, on a screen. The preview mode may be a mode for displaying at least one of the recorded videos.

The electronic apparatus 100 may provide a plurality of videos included in a list in a preview mode, or provide only a video where texts are recorded among a plurality of videos included in a list in a preview mode, and the other videos in a still image. The electronic apparatus 100 may provide a video which is recorded at or most recently among a plurality of videos included in a list in a preview mode, and the other videos in a still image.

Figure 17A:
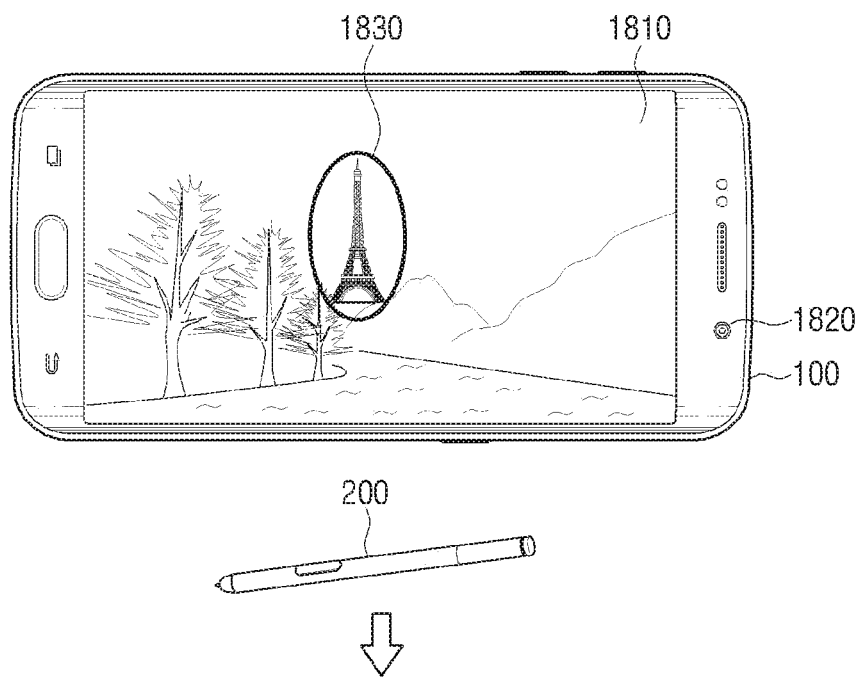
FIGS. 17A and 17B are views to explain a performing of an operation according to a signal generated by an electronic pen of an electronic apparatus according to an embodiment of the disclosure.
Figure 17B:
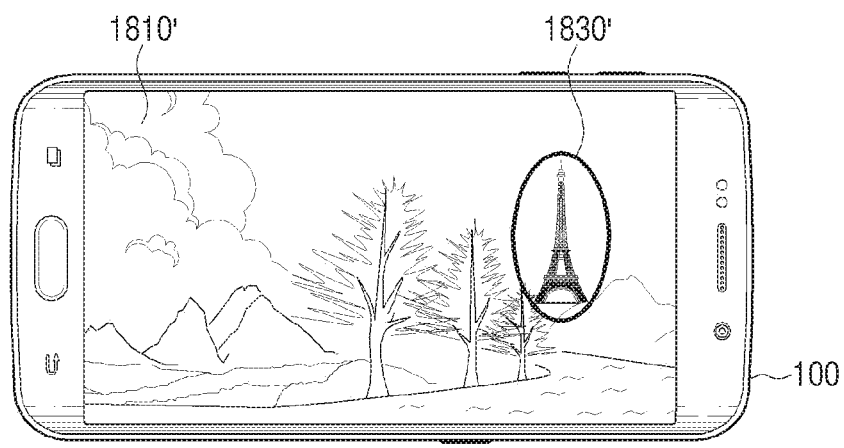

FIGS. 17A and 17B are views to explain a performing of an operation according to a signal generated by an electronic pen of an electronic apparatus according to a further aspect of the disclosure.

Referring to FIGS. 17A and 17B, the electronic apparatus 100 may display a live image 1810 to be recorded in a recording mode on a screen. While the live image is being displayed, the electronic apparatus 100 may sense a signal generated by the electronic apparatus 100 (e.g., an electronic pen). When it is determined that the sensed signal is a first signal for detecting an object, the electronic apparatus 100 may determine an area where the first signal is sensed, and detect an object 1830 in the determined area.

The electronic apparatus 100 may emit light of predetermined first color related to the first signal through the LED 1820 arranged at the upper front of the screen that displays the live image 1810. A user may determine the type of signal that is generated by the electronic pen 200 based on light of the first color which is emitted through the electronic apparatus 100.

When the object 1830 is detected, the electronic apparatus 100 may set recording so that the object 1830, which is detected, may be focused and the live image 1810 may be photographed.

When an event occurs where a user or an object moves in the state where the live image 1810 focused on the object 1830 is displayed, the electronic apparatus 100 may display 'a live image 1810', which is changed corresponding to the event on a screen.

When the event occurs, the electronic apparatus 100 may display 'the live image 1810' including 'the object 1830' which moves from a first point to a second point as shown in FIG. 17B. The electronic apparatus 100 may perform tracking with respect to the object 1830 based on the object 1830, which is pre-focused, and display 'the live image 1810' focused to 'the object 1830' that is moved to the second point.

The detailed description of the operation of each element of the electronic apparatus 100 according to the disclosure has been made through various embodiments. Hereinafter, a method for controlling the electronic apparatus 100 according to the disclosure will be described in detail.

FIG. 18 is a flowchart to explain a controlling method of an electronic apparatus according to an embodiment of the disclosure.

Referring to FIG. 18, an electronic apparatus 100 may sense a signal generated by the electronic pen 200 at operation S1710. When an object displayed on a touch screen is selected by a sensed signal, the electronic apparatus 100 may perform a function of the selected object according to the sensed signal. The electronic apparatus 100 may determine whether the signal is a first signal based on the frequency of the sensed signal when a signal generated by the electronic pen 200 is sensed at operation S1720.

As a result of determination, when the sensed signal is a first signal, the electronic apparatus 100 may provide the search result related to the selected object based on the first signal at operation S1730.

According to an embodiment, the electronic apparatus 100 may determine an area where the first signal is sensed, and detect an object displayed on a touch screen based on the determined area. The electronic apparatus 100 may transmit information on the detected object to an external server (not shown), and receive a search result with respect to the pre-detected object from the server (not shown).

According to another embodiment, the electronic apparatus 100 may determine an area where the first signal is sensed and detect an object displayed on the touch screen based on the determined area. The electronic apparatus 100 may extract the search result with respect to the object from the pre-stored information based on the information on the pre-detected object.

When the sensed signal is not a first signal, the electronic apparatus 100 may determine whether the sensed signal is a second signal at operation S1740. As a result of determination, when the sensed signal is a second signal, the electronic apparatus 100 may determine an area where the second signal is sensed, and detect an object displayed on a touch screen based on the determined area. The electronic apparatus 100 may provide a UI for editing, sharing and storing information on the pre-detected object at operation S1750.

The UI may include a plurality of elements for editing, sharing and storing information on the detected object. The electronic apparatus 100 may display a UI including a plurality of elements for editing, sharing and storing information on the pre-detected object on a touch screen.

When one of the plurality of elements included in the displayed UI is selected, the electronic apparatus 100 may perform a processing operation corresponding to the selected element among processing operations of editing, sharing and storing information on the pre-detected object.

When it is determined that the sensed signal is a third signal at operation S1740, the electronic apparatus 100 may perform a writing function based on the sensed signal at operation S1760.

The electronic apparatus 100 may display a different color at the position where the signal is detected according to the type of signal generated by the electronic pen 200.

Based on selecting an object based on the first signal generated by the electronic pen 200, the electronic apparatus 100 may display a first color at the position where the first signal is detected of the touch screen to select the object. Based on the object being selected based on the second signal generated by the electronic pen 200, the electronic apparatus 100 may display a second color at the position where the second signal is detected of the touch screen to select the object.

The electronic apparatus 100 may emit light of a different color through a light emitting unit provided in a body of the electronic apparatus 100 according to the type of signal generated by the electronic pen 200.

When a first signal is sensed by the electronic pen 200, the electronic apparatus 100 may emit light of first color through a light emitting unit provided in a body of the electronic apparatus 100, and when a second signal is detected by the electronic pen 200, the electronic apparatus 100 may emit light of second color through the light emitting unit provided in the body of the electronic apparatus 100.

According to the touch state of the electronic pen 200, the electronic apparatus 100 may determine an area where a signal generated by the electronic pen 200 is sensed as a user input for selecting a relative object.

Based on sensing a user input including at least one of a long-press input for touching an area where an object is displayed through the electronic pen 200 for a predetermined period of time, a double-tab input for touching an area where an object is displayed multiple times, a touch input for touching a predetermined pattern on the area where the object is displayed, and a touch input for touching the area where the object is displayed with a predetermined pressure or greater, the electronic apparatus 100 may determine a sensed user input as a user input for selecting an object.

When a user input which is input through the electronic pen 200 is a user input for selecting an object, the electronic pen 200 may detect an object in an area where a signal generated by the electronic pen 200 is sensed. The electronic apparatus 100 may provide a search result for a pre-detected object or a UI for performing a function related to the object according to the type of signal generated by the electronic pen 200.

The electronic pen 200 may change a signal generated by the electronic pen 200 by the touch of the button provided in the electronic pen 200. The electronic pen 200 may emit light of color corresponding to a signal generated by the electronic pen 200 through a light emitting unit provided on one side surface of the electronic pen 200.

When a button provided in the electronic pen 200 is pressed, the electronic pen 200 may generate a first signal having first frequency and emit light of first color corresponding to the first signal through the light emitting unit.

When a button provided in the electronic pen 200 is pressed while the first signal having the first frequency is generated, the electronic pen 200 may generate a second signal having second frequency from the first signal having the first frequency, and emit light of the second color corresponding to the second signal through the light emitting unit.

A user may change the frequency of the signal to be transmitted to the electronic apparatus 100 through the button provided in the electronic pen 200, and identify whether the signal is changed from the color of light that emits through the light emitting unit provided on one side surface of the electronic pen 200.

Meanwhile, the control method of the electronic apparatus 100 as described above may be implemented as at least one execution program, and the execution program may be stored in a non-transitory computer-readable medium.

A non-transitory readable medium may be a medium that semi-permanently stores data and is readable by a device, not a medium a medium that stores data for a short period of time such as a register, a cache, a memory, etc. Specifically, the above-described program may be stored in a computer-readable recording medium such as a random-access memory (RAM), a flash memory, a read-only memory (ROM), an erasable programmable ROM (EPROM), an electronically erasable and programmable ROM (EEPROM), a register, a hard disk, a removable disk, a memory card, a universal serial bus (USB) memory, a CD-ROM, or the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus, comprising:
a light emitting device;
a touch screen for sensing a signal generated by an electronic pen and displaying an image; and
at least one processor configured to:
in response to an object displayed on the touch screen being selected based on a first signal generated by the electronic pen, obtain a search result for the selected object and control the touch screen to display the search result, and
in response to the object displayed on the touch screen being selected based on a second signal generated by the electronic pen, control the touch screen to display a user interface (UI) for performing a function related to the selected object,
wherein the at least one processor is configured to control the light emitting device to emit light of a first color while the first signal is sensed, and control the light emitting device to emit light of a second color while the second signal is sensed.

2. The electronic apparatus as claimed in claim 1, wherein the at least one processor is further configured to:
in response to the object being selected based on the first signal, control the touch screen to display a first color at a position where the first signal is sensed to select the object, and
in response to the object being selected based on the second signal, control the touch screen to display a second color at a position where the second signal is sensed to select the object.

3. The electronic apparatus as claimed in claim 1, further comprising:
a communicator,
wherein the at least one processor is further configured to:
determine an area where the first signal is sensed and detect the object displayed on the touch screen based on the area where the first signal is sensed, and
control the communicator to transmit information on the detected object to an external server and receive a search result for the object from the external server.

4. The electronic apparatus as claimed in claim 1, further comprising:
a storage,
wherein the at least one processor is further configured to:
determine an area where the first signal is sensed,
detect the object displayed on the touch screen based on the area where the first signal is sensed, and
extract a search result for the object from the storage based on information on the detected object.

5. The electronic apparatus as claimed in claim 1,
wherein the UI includes a plurality of elements for editing, sharing and storing information on the detected object, and
wherein the at least one processor is further configured to, based on one of the plurality of elements being selected, perform a processing operation corresponding to the selected element among processing operations of editing, sharing, storing information on the detected object.

6. The electronic apparatus as claimed in claim 1, wherein the at least one processor is further configured to perform a writing function based on a third signal generated by the electronic pen.

7. The electronic apparatus as claimed in claim 1, wherein a user input for selecting the object includes at least one of a long-press input for touching an area where the object is displayed for a predetermined period of time, a double-tab input for touching the area where the object is displayed multiple times, a touch input for touching a predetermined pattern on the area where the object is displayed, or a touch input for touching the area where the object is displayed with a predetermined pressure or greater.

8. The electronic apparatus as claimed in claim 1, wherein the signal generated by the electronic pen is changed as a button provided in the electronic pen is pressed.

9. The electronic apparatus as claimed in claim 8, wherein the electronic pen emits light of a color corresponding to the signal generated by the electronic pen through a light emitting device provided on one side surface of the electronic pen.

10. A controlling method for an electronic apparatus comprising a light emitting device, the method comprising:
sensing a signal generated by an electronic pen; and
based on an object displayed on a touch screen being selected by the sensed signal, performing a function related to the selected object according to the sensed signal,
wherein the performing of the function comprises:
based on the sensed signal being a first signal, providing a search result for the selected object based on the first signal and emitting light of a first color through the light emitting device, and
based on the sensed signal being a second signal, providing a user interface (UI) for performing a function related to the selected object based on the second signal and emitting light of a second color through the light emitting device.

11. The method as claimed in claim 10, wherein the performing of the function comprises:
based on the object being selected based on the first signal, displaying a first color at a position where the first signal is sensed on a touch screen to select the object, and
based on the object being selected based on the second signal, displaying a second color at a position where the second signal is sensed on the touch screen to select the object.

12. The method as claimed in claim 10, wherein the performing of the function comprises:
determining an area where the first signal is sensed,
detecting the object displayed on the touch screen based on the area where the first signal is sensed, and
transmitting information on the detected object to an external server and receiving a search result for the object from the external server.

13. The method as claimed in claim 10, wherein the performing of the function comprises:
determining an area where the first signal is sensed,
detecting the object displayed on the touch screen based on the area where the first signal is sensed, and
extracting a search result for the object from pre-stored information based on information on the detected object.

14. The method as claimed in claim 10,
wherein the UI includes a plurality of elements for editing, sharing and storing information on the detected object, and
wherein the performing of the function comprises, based on one of the plurality of elements being selected, performing a processing operation corresponding to the selected element among processing operations of editing, sharing and storing information on the detected object.

15. The method as claimed in claim 10, where the performing of the function comprises, based on the sensed signal being a third signal, performing a writing function based on the third signal.

16. The method as claimed in claim 10, wherein a user input for selecting the object includes at least one of a long-press input for touching an area where the object is displayed for a predetermined period of time, a double-tab input for touching the area where the object is displayed multiple times, a touch input for touching a predetermined pattern on the area where the object is displayed, or a touch input for touching the area where the object is displayed with a predetermined pressure or greater.

17. The method as claimed in claim 10, wherein the signal generated by the electronic pen is changed as a button provided in the electronic pen is pressed.

18. The method as claimed in claim 17, wherein the electronic pen emits light of a color corresponding to the signal generated by the electronic pen through a light emitting device provided on one side surface of the electronic pen.

19. The electronic apparatus as claimed in claim 1, wherein the first signal has a first frequency and the second signal has a second frequency different from the first frequency.

* * * * *